(12) United States Patent
Nicholson et al.

(10) Patent No.: US 8,545,244 B2
(45) Date of Patent: Oct. 1, 2013

(54) CONNECTION SYSTEM AND METHOD FOR SUBSEA CABLES IN SEVERE ENVIRONMENTS

(75) Inventors: Joseph Allan Nicholson, Broughton-in-Furness (GB); Eric Chaize, Barrow-in-Furness (GB); Stephen Henry, Barrow-in-Furness (GB); Kirtikumar Patel, Fresno, TX (US); Jeff Marabella, Friendswood, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 490 days.

(21) Appl. No.: 12/794,162

(22) Filed: Jun. 4, 2010

(65) Prior Publication Data

US 2011/0155459 A1 Jun. 30, 2011

Related U.S. Application Data

(60) Provisional application No. 61/291,336, filed on Dec. 30, 2009.

(51) Int. Cl.
*H01R 4/60* (2006.01)

(52) U.S. Cl.
USPC ............................................ 439/204; 439/936

(58) Field of Classification Search
USPC ................... 439/460, 191, 936, 204; 174/76; 166/338
See application file for complete search history.

(56) References Cited

U.S. PATENT DOCUMENTS

| | | | |
|---|---|---|---|
| 2,886,626 A * | 5/1959 | Burnett et al. | 174/18 |
| 4,050,765 A | 9/1977 | Duesterhoeft | |
| 4,259,543 A | 3/1981 | Oldham | |
| 4,589,492 A * | 5/1986 | Greiner et al. | 166/338 |
| 4,686,327 A | 8/1987 | Christian | |
| 6,778,743 B1 | 8/2004 | Maurice | |
| 6,796,821 B2 * | 9/2004 | Cairns et al. | 439/204 |
| 7,112,080 B2 * | 9/2006 | Nicholson | 439/283 |
| 7,520,768 B2 * | 4/2009 | Nicholson | 439/190 |
| 7,690,936 B1 * | 4/2010 | Snekkevik et al. | 439/281 |
| 2006/0188202 A1 * | 8/2006 | Deans | 385/100 |
| 2007/0053629 A1 | 3/2007 | Meyyappan et al. | |
| 2008/0022374 A1 | 1/2008 | Brown et al. | |
| 2009/0047815 A1 | 2/2009 | Nicholson | |
| 2009/0056950 A1 | 3/2009 | Nicholson et al. | |
| 2010/0015769 A1 | 1/2010 | Herrick et al. | |

FOREIGN PATENT DOCUMENTS

| | | |
|---|---|---|
| GB | 2124038 A1 | 2/1984 |
| WO | 2008113026 A1 | 9/2008 |
| WO | 2009133474 A2 | 11/2009 |

* cited by examiner

*Primary Examiner* — Phuong Dinh
(74) *Attorney, Agent, or Firm* — Jeffrey Peterson; Brandon S. Clark

(57) ABSTRACT

A technique facilitates the reliable connection of cables in subsea environments. A cablehead system is designed to reliably connect cables to subsea components while providing long term protection of the connection in potentially harsh, subsea environments. The cablehead system comprises a cable clamp housing which may be coupled to a bulkhead assembly by a cavity housing which provides space for routing of internal communication lines. One or more additional protective components are incorporated into the cablehead system to ensure a reliable connection and to further protect the internal communication lines from exposure to the surrounding environment.

25 Claims, 6 Drawing Sheets

CONNECTION SYSTEM AND METHOD FOR SUBSEA CABLES IN SEVERE ENVIRONMENTS

BACKGROUND

In many subsea well applications, connections are formed between underwater cables and various devices or systems at subsea locations. For example, subsea connections are formed between umbilicals and subsea installations that may be positioned at a seafloor. Subsea installations are used in a variety of oil and gas production and/or servicing operations. Generally, a cablehead is used to connect electrical conductors of the underwater cable with the corresponding device or system while protecting the electrical conductors from the subsea environment.

However, existing cablehead designs can be unreliable in subsea applications due to the severe environments experienced, particularly in deep-sea oil and gas operations. The success of a given connection may be sensitive to specific cablehead termination techniques. Additionally, the reliability of a given connection is affected by numerous components within existing cableheads, including grease barriers, wire boot seals, cable terminations, cable anchors, and other components susceptible to the harsh environment.

SUMMARY

In general, the present invention comprises a system and methodology for providing reliable connection of cables in subsea environments. A cablehead system is designed to provide a secure connection between cables and subsea components while providing long term protection of the connection in potentially harsh environments. The cablehead system comprises a cable clamp housing which may be coupled to a bulkhead assembly by a cavity housing. One or more additional protection components are incorporated into the cablehead system to ensure a reliable connection and to protect the internal communication lines, e.g. electrical conductors, from exposure to the surrounding environment.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a system and methodology for forming reliable connections in a subsea environment. The system and methodology described herein relate to a cablehead system which provides a simple, reliable structure for connecting cables to desired components in a harsh, subsea environment. The cablehead system also incorporates one or more productive features designed to facilitate formation and maintenance of the desired connection.

For example, protective features which may be used to improve the subsea cable connection may include an armor clamping mechanism. In some embodiments, the armor clamping mechanism is connected to a fixed armor earth termination to improve grounding. Additional examples of such features comprise a swivel which accommodates a predetermined amount of rotation between cablehead system housing components. Other features which improve functionality and reliability may include a cavity housing which may be filled with a gel, e.g. a dielectric gel or a 2-part solidifying compound, to protect conductor terminations. Additionally, elastomeric seals may be employed in a unique cablehead structure to improve the prevention of fluid ingress into areas around the conductors. Insulation materials, such as thermoplastic materials, also may be deployed within the unique cablehead system. The various cablehead system features are used collectively or in various combinations to provide a cablehead system better able to withstand harsh, subsea environments.

Figure 1:
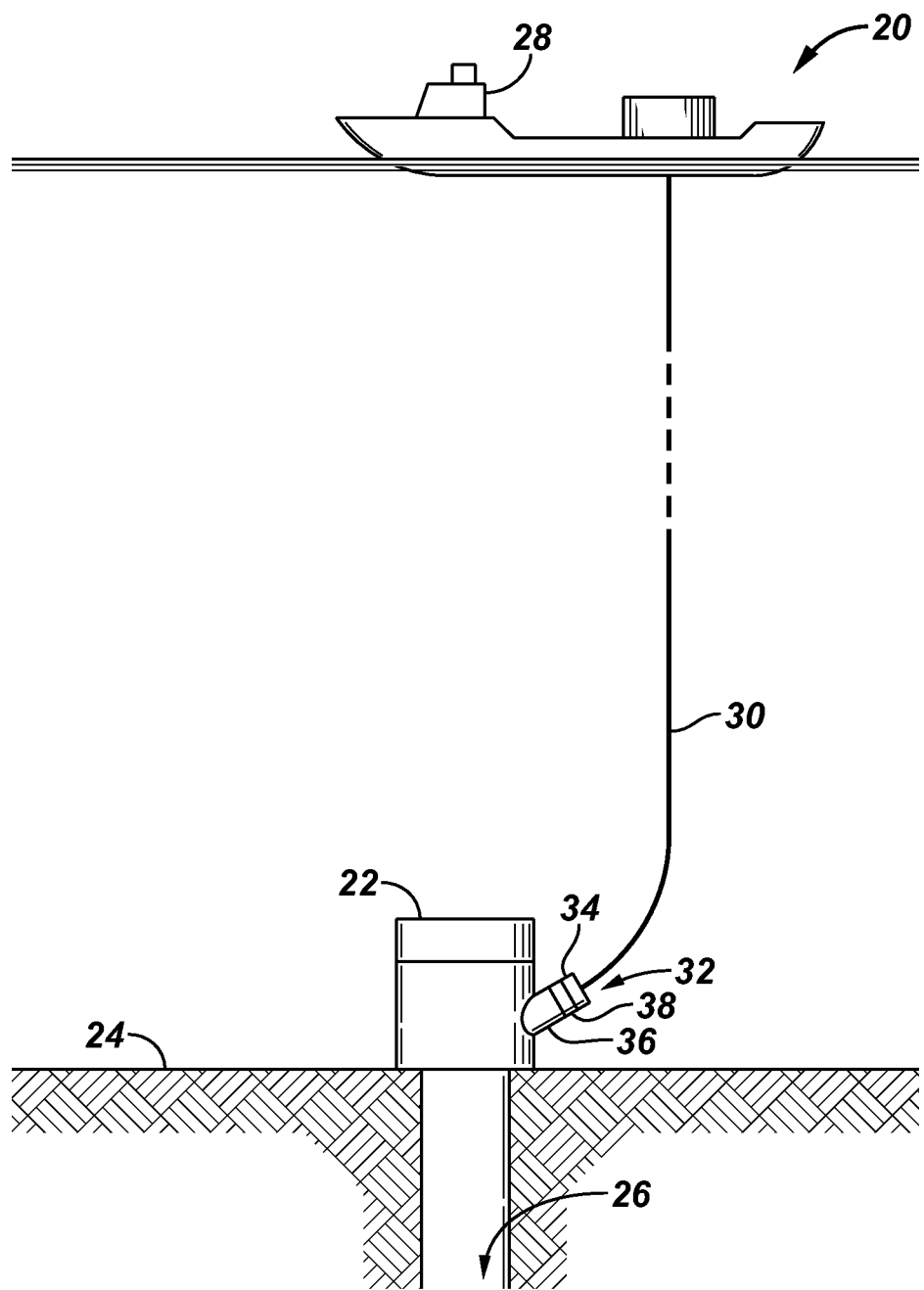
FIG. 1 is a schematic view of one example of a subsea application having a cablehead system, according to an embodiment of the present invention.

Referring generally to FIG. 1, one schematic example of a general subsea well system 20 is illustrated as having a subsea component 22 positioned at a subsea location, e.g. positioned on a subsea floor 24. In one embodiment, the subsea component 22 is a subsea installation used in oil and/or gas related operations. Depending on the specific application, the subsea installation may comprise a variety of systems and components, e.g. wellhead, manifold, riser installation, or other type of installation, related to subsea well servicing or to the production of oil and/or gas from one or more subsea wells 26.

The subsea installation 22 is connected to a facility 28, e.g. a surface facility, via a subsea cable 30. In many applications, the subsea cable 30 is routed down from a surface vessel, platform, or another type of surface facility 28. The subsea cable 30 may be in the form of an umbilical protected by one or more outer armor layers. As illustrated, the subsea cable 30, e.g. umbilical, is connected to the subsea component 22 by a cablehead system 32 which is constructed to provide a reliable, protected connection between the subsea cable 30 and the subsea component, e.g. subsea installation 22. The cablehead system 32 protects internal electrical conductors and/or other communication lines from the harsh subsea environment. The design of cablehead system 32 allows the subsea cable 30 to deliver substantial electrical power to the subsea component. The subsea cable 32 also may be used to relay communication data between subsea installation 22 and surface facility 28.

In the embodiment illustrated, cablehead system 32 comprises a cable clamp housing 34 which is coupled to a bulkhead assembly 36 by a cavity housing 38. The bulkhead assembly 36 is mounted to the subsea component 22 and presents the internal communication lines, e.g. electrical conductors, of the subsea component for engagement with subsea cable 30 via cablehead system 32. As described in greater detail below, the cable clamp housing 34 securely grips the subsea cable 30, while the cavity housing 38 facilitates connection of communication lines between the subsea cable 30 and the subsea component 22. The cavity housing 38 also cooperates with other components of the cablehead system 32 to protect the communication line terminations from exposure to the harsh, surrounding environment.

Figure 2:
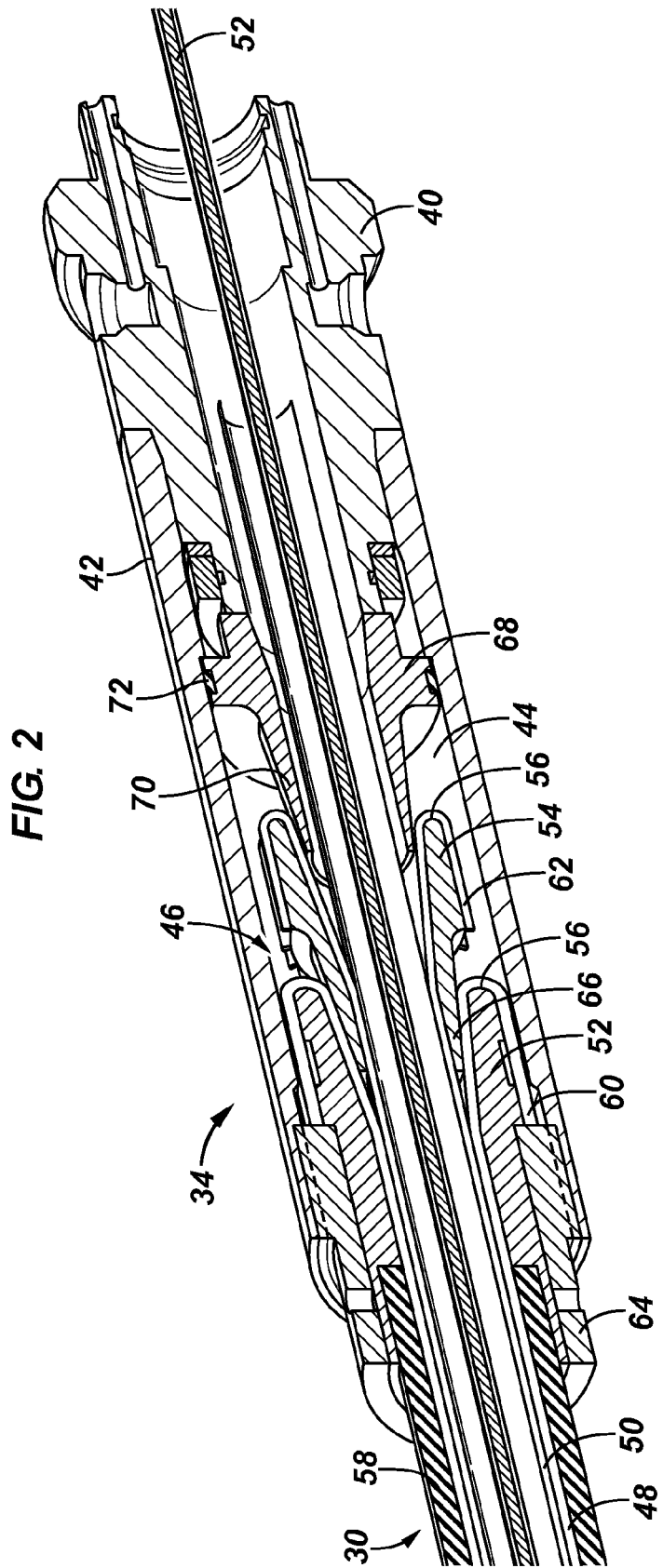
FIG. 2 is a cross-sectional view of one embodiment of a cable coupled with a cable clamp housing assembly which may be used as part of the cablehead system, according to an embodiment of the present invention.

Referring generally to FIG. 2, one embodiment of cable clamp housing 34 is illustrated as engaged with one example of subsea umbilical 30. In this embodiment, cable clamp housing 34 comprises a front cable clamp housing 40 to which a back cable clamp housing 42 is rotatably mounted. However, the angle of rotation through which the back cable clamp housing 42 is allowed to rotate with respect to front cable clamp housing 40 may be limited. The cable clamp housing 34 further comprises an interior 44 into which subsea cable 30 is received and securely held by an armor clamping system 46.

The armor clamping system 46 is designed to engage and hold one or more armor layers of subsea cable 30. In the embodiment illustrated, for example, subsea cable 30 comprises an outer armor layer 48 and an inner armor layer 50 which serve to protect internal communication lines 52. In this particular example, the internal communication lines 52 comprise a plurality of electrical conductors designed to convey power and/or communication signals. The armor clamping system 46 comprises one or more retention members, such as a first retention number 52 and a second retention member 54, as further illustrated in FIG. 2. The retention members 52, 54 may each be wedge shaped with a leading edge 56 designed to help secure the armor layers of subsea cable 30.

As illustrated in the example of FIG. 2, an outer protective layer 58 of cable 30 may be removed to expose armor layers 48, 50. The outer armor layer 48 is folded back over retention member 52, and inner armor layer 50 is folded back over retention member 54. In this example, retention members 52, 54 are each circular in cross-section, i.e. ring shaped, such that the armor layers may be inserted through the center of the ring shape and then folded back over the exterior of each ring shaped retention member. For example, outer armor layer 48 may be folded around the leading edge 56 of retention member 52 such that a distal end flap 60 of outer armor layer 48 is positioned between the retention member 52 and the back cable clamp housing 42. Similarly, the inner armor layer 50 may be folded around the leading edge 56 of retention member 54 such that a distal end flap 62 of inner armor layer 50 is positioned between the retention member 54 and the back cable clamp housing 42.

In the embodiment illustrated, retention member 52 may be securely mounted within back cable clamp housing 42 by a mounting collar 64 which is threadably received or otherwise attached to back cable clamp housing 42. The second retention member 54 is stacked against retention member 52 such that a wedge region 66 forces retention member 52 to clamp flap 60 against the surrounding back cable clamp housing 42. Similarly, a backing member 68 may be positioned between front cable clamp housing 40 and retention member 54 such that a wedge region 70 forces retention member 54 to clamp flap 62 against the surrounding back cable clamp housing 42. As a result, armor clamping system 46 is able to securely retain subsea cable 30 within cable clamp housing 34.

Additionally, a variety of elastomeric seals 72 may be used to prevent any fluid ingress into areas where the internal connectors 52 are less protected. By way of example, seals 72 may be positioned between the armor clamping system 46 and the cavity housing 38. However, a variety of additional or other seals also may be used to prevent unwanted ingress of well fluid. Seals 72 may be formed from a thermoplastic material, e.g. a PEEK™ material, or other suitable sealing material.

Figure 3:
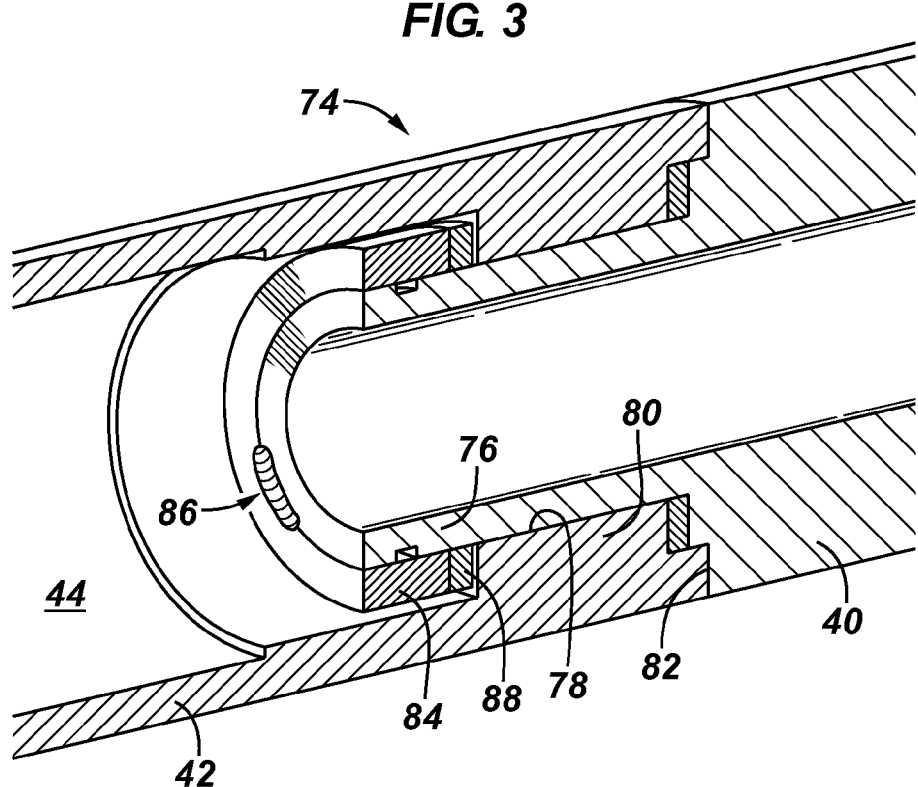
FIG. 3 is a cross-sectional view of one example of a rotational connection between housing portions of the cable clamp housing assembly, according to an embodiment of the present invention.

According to one embodiment, the back cable clamp housing 42 is mounted to swivel/rotate with respect to front cable clamp housing 40. As further illustrated in FIG. 3, the front cable clamp housing 40 and back cable clamp housing 42 are joined by a swivel mechanism 74. The swivel mechanism 74 may be constructed in a variety of forms, but one example employs a neck 76 of front cable clamp housing 40 received in a narrowed opening 78 of back cable clamp housing 42. The narrowed opening 78 may be formed by one or more expanded regions 80 of back cable clamp housing 42 which extend radially inward toward neck 76. The expanded regions 80 are captured between an abutment wall 82 of front cable clamp housing 40 and a retention ring 84. Retention ring 84 may be secured to an end of neck 76 by an appropriate fastening mechanism 86, e.g. a weld. A thrust washer 88 may be positioned between retention ring 84 and expanded regions 80.

Figure 4:
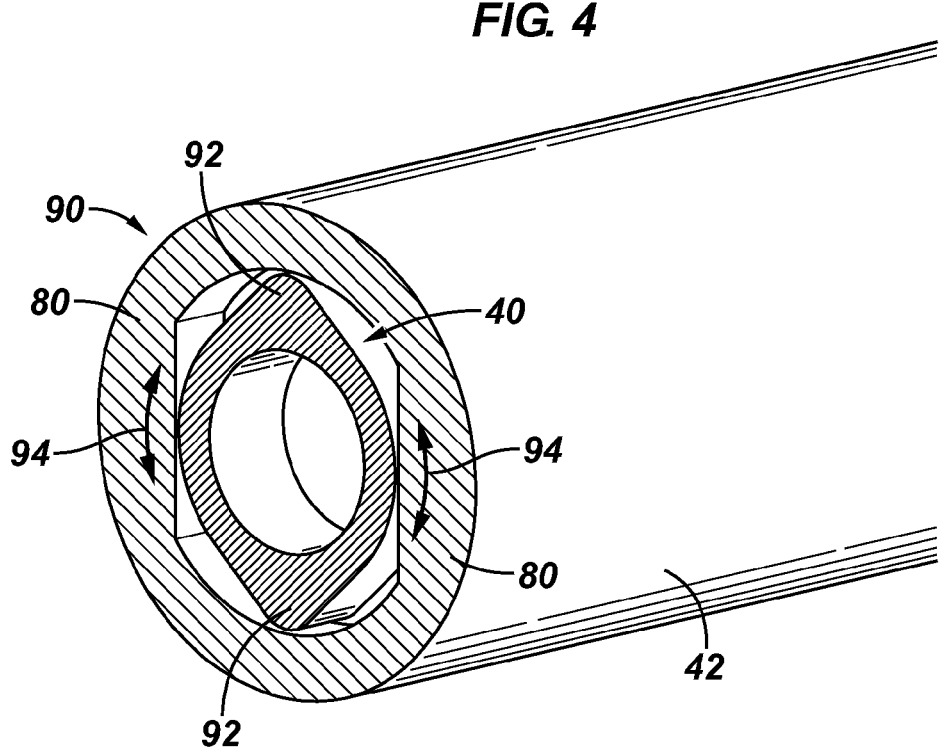
FIG. 4 is a cross-sectional view of one example of a mechanism for limiting the included angle through which the rotational connection illustrated in FIG. 3 is allowed to rotate, according to an embodiment of the present invention.

In some applications, the relative rotation of back cable clamp housing 42 with respect to front cable clamp housing 40 is limited to a desired included angle of rotation by a rotation limiter 90, as illustrated in FIG. 4. By way of example, the relative rotation may be limited to plus or minus 50° for a total rotational motion through an included angle of approximately 100°. The rotational movement may be limited to other desired angles designed to facilitate connection of the subsea cable 30 and its internal communication lines 52 with the corresponding subsea component 22. In one embodiment, the rotational movement is limited by forming expanded regions 80 as a pair of expanded regions which extend along a portion of the interior of back cable clamp housing 42. Between the expanded regions 80, neck 76 of front cable clamp housing 40 comprises a pair of eccentrics 92. The relative rotation of back cable clamp housing 42 with respect to the front cable clamp housing 40 is limited when eccentrics 92 are blocked by expanded regions 80. The cable clamp housings can rotate relative to each other in the directions of arrows 94 but only through the predetermined included angle established by the interference of eccentrics 92 with expanded regions 80.

Figure 5:
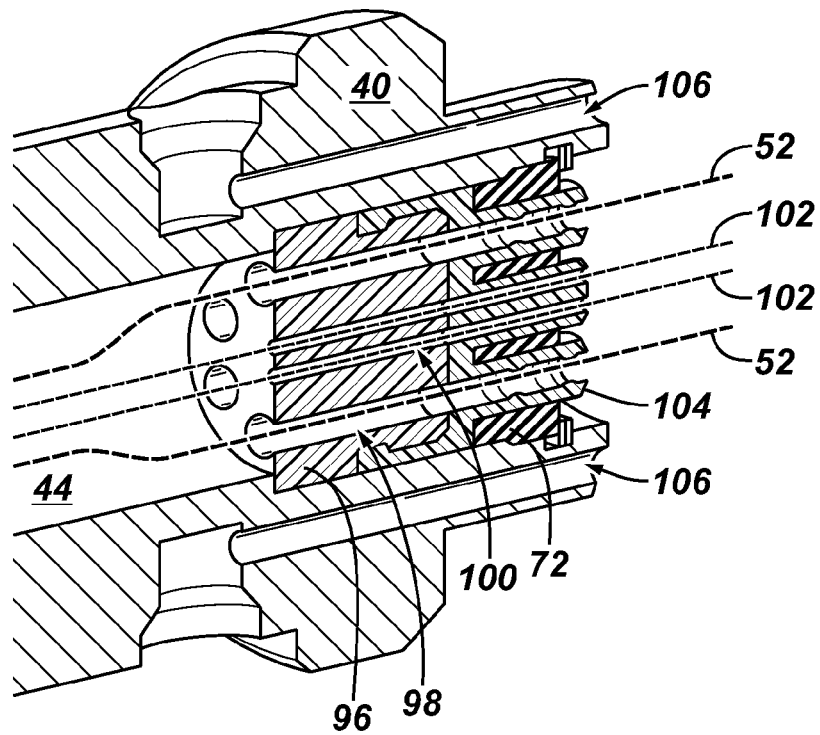
FIG. 5 is a cross-sectional view of a conductor sleeve positioned within a cable clamp housing of the cable clamp housing assembly, according to an embodiment of the present invention.

Referring generally to FIG. 5, a conductor sleeve 96 is illustrated as disposed within the interior 44 of front cable clamp housing 40. Conductor sleeve 96 is formed from an insulating material, such as an insulating thermoplastic material, and comprises a plurality of passages, e.g. a plurality of conductor passages 98 and one or more armor wire passages 100. The conductor passages 98 are designed to insulate and segregate a plurality of electrical conductors 52 or other types of internal communication lines. Similarly, the armor wire passages 100 are designed to insulate and segregate one or more armor wires 102 which extend from the one or more armor layers 48, 50 to a grounding member, as discussed in greater detail below.

As further illustrated in FIG. 5, the conductor sleeve 96 also comprises termination boot supports 104. The termination boot supports are designed to support the conductor terminations of subsea cable 30 when deployed into the cablehead system 32 for engagement with corresponding conductor terminations of the subsea component 22. Additional seals 72 may be employed around termination boot supports 104 or around other portions of the conductor sleeve 96 to further prevent the unwanted ingress of well fluid. Also, FIG. 5 illustrates additional protective features in the form of ports 106 which are located in cable clamp housing 34, e.g. front cable clamp housing 40, and routed to the cavity housing 38. Ports 106 may be used to facilitate the introduction of gel, e.g. dielectric gel or 2-part solidifying compound, into cavity housing 38.

Figure 6:
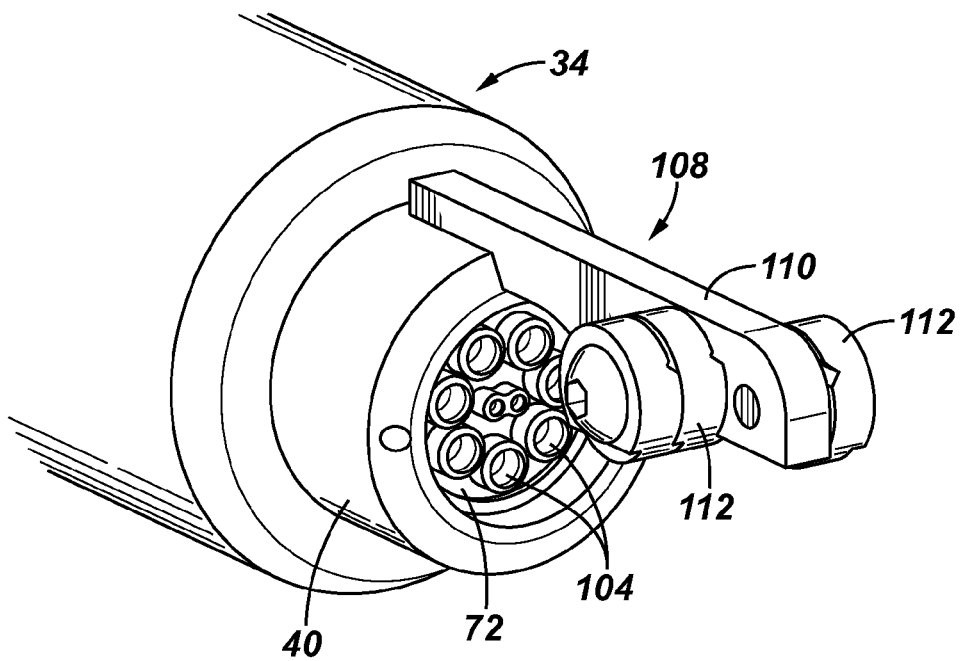
FIG. 6 is an orthogonal view of one embodiment of a grounding member connected to the cable clamp housing assembly, according to an embodiment of the present invention.

Referring generally to FIG. 6, one embodiment of a grounding member 108 is illustrated. In this embodiment, grounding member 108 comprises a grounding arm 110 which serves as a fixed armor earth termination. The grounding arm 110 may be designed to extend from cable clamp housing 34 into cavity housing 38 to facilitate grounding of subsea cable 30. As described above, one or more armor wires 102 may be connected between one or more of the armor layers 48, 50; routed through conductor sleeve 96; and attached to grounding member 108. In some embodiments, both an electrical conductor 52 and a grounding wire 102 may be wrapped around, or otherwise attached to, grounding member 108 to provide a secure earth grounding. The grounding arm 110 also may serve to provide tensile support for the conductor wire 52 and at least one armor wire 102 which are attached to the grounding member. In some applications, the grounding arm 110 may comprise one or more extensions 112 designed to facilitate better contact and grounding.

Figure 7:
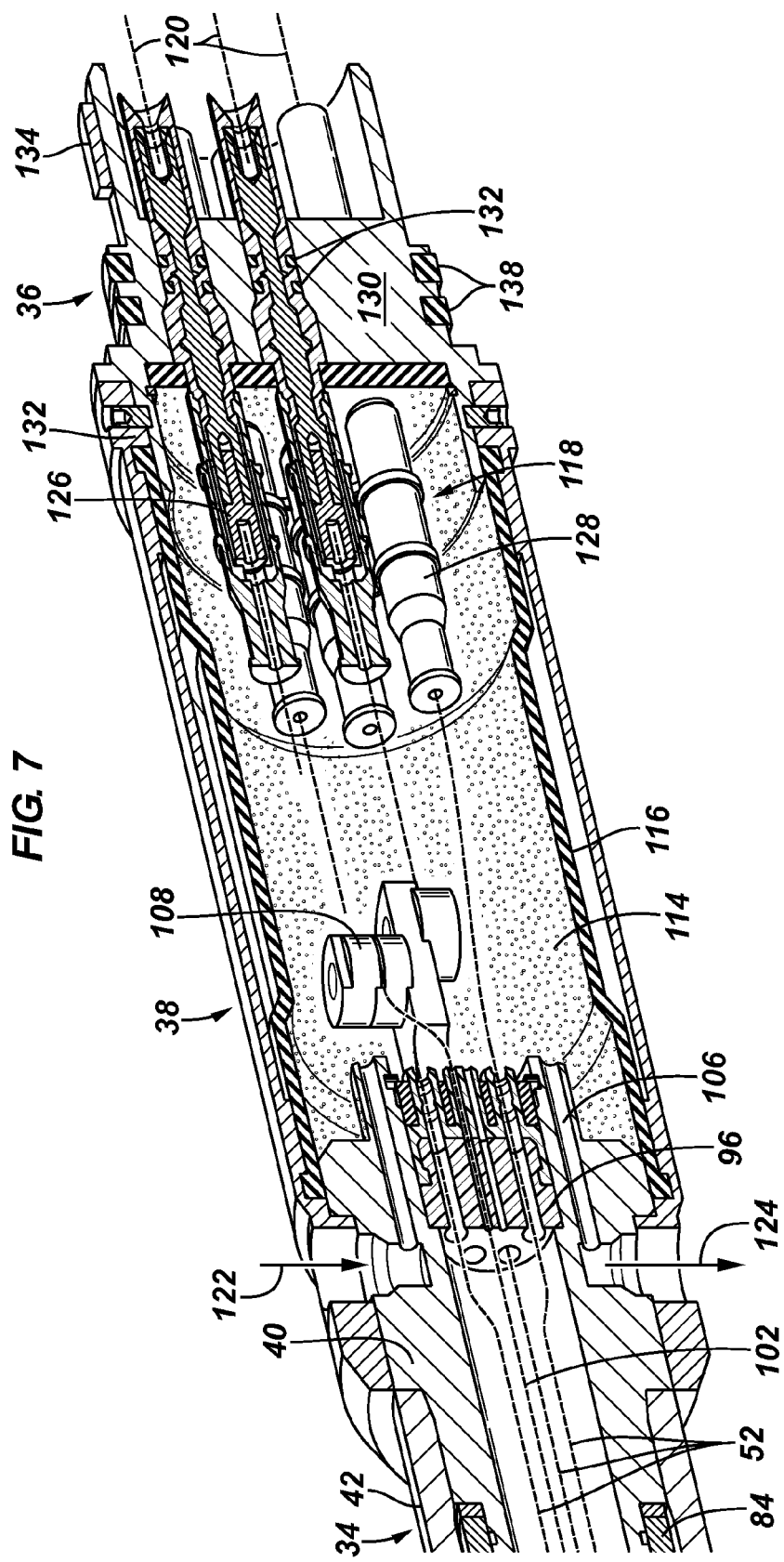
FIG. 7 is a cross-sectional view of one embodiment of a cavity housing coupled between the cable clamp housing assembly and a bulkhead assembly, according to an embodiment of the present invention.

Depending on the structure of cable head system 32, grounding arm 110 may be connected and positioned in a variety of configurations. According to one example, the grounding arm 110 is welded or otherwise conductively fastened to front cable clamp housing 40, as illustrated in FIG. 6. In this embodiment, grounding arm 110 is oriented to extend into cavity housing 38 and into a gel 114, e.g. a dielectric gel, within cavity housing 38, as illustrated in FIG. 7. The cavity housing 38 and internal gel 114 are designed to provide further protection for the conductor terminations formed within cable head system 32.

Cavity housing 38 is connected between front cable clamp housing 40 and bulkhead assembly 36 by fasteners, threaded engagement, or other suitable fastening mechanisms. Within cavity housing 38, a pressure compensating bladder 116 may be used to balance the surrounding wellbore pressure with internal pressure inside cable head system 32. In the example illustrated, gel 114 is pumped into pressure compensating bladder 116 to isolate a plurality of contact structures 118 by which electrical conductor wires 52 are connected with corresponding electrical conductors 120 extending from subsea component 22. The contact structures 118 also may be designed to couple other types of communication lines. The gel 114 may be pumped into cavity housing 38, e.g. into pressure compensating bladder 116, through one of the ports 106, as represented by arrow 122, and excess gel 114 may be bled off through another port 106, as represented by arrow 124.

The contact structures 118 may be designed to accommodate the joining of a variety of electrical terminations or other communication line terminations. In the embodiment illustrated, a plurality of corresponding conductor terminations 126 are engaged to conductively join conductor wires 52 with electrical conductors 120. The terminations 126 may be protected by an insulation material 128 which is overmolded onto contact structures 118. Additionally, bulkhead assembly 36 may be designed with a bulkhead 130 which surrounds the individual contact structures 118 and seals against the contact structures via a plurality of seals 132 to again prevent unwanted migration of fluids.

Figure 8:
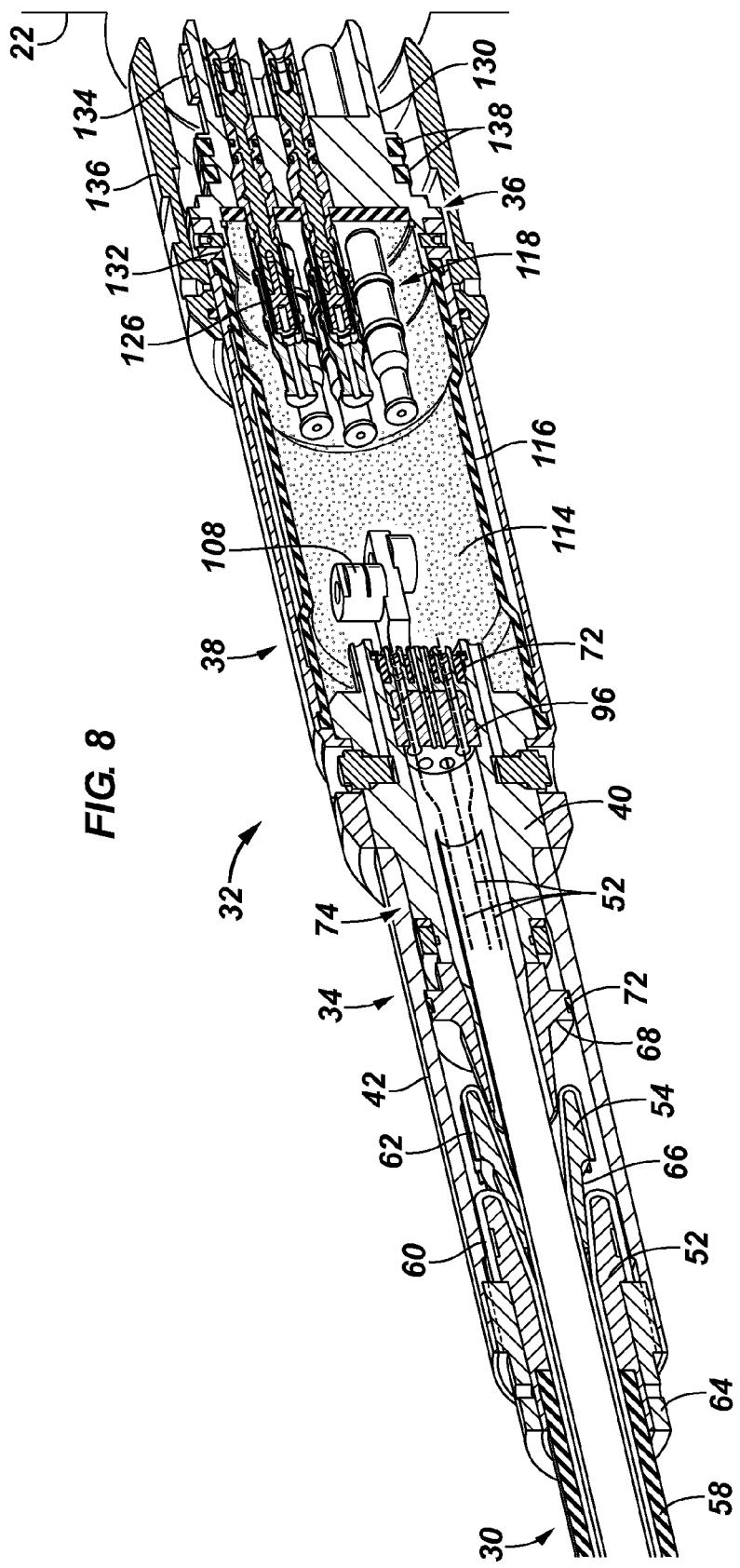
FIG. 8 is a cross-sectional view of one embodiment of the entire cablehead system used to connect a subsea cable to a subsea component via a bulkhead assembly, according to an embodiment of the present invention.

Bulkhead assembly 36 may be formed in a variety of configurations depending on the size and configuration of subsea component 22. By way of example, the bulkhead assembly 36 comprises a first portion 132 which extends into gel cavity housing 38 and a second portion 134 which extends into a corresponding housing 136 on subsea component 22, as illustrated best in FIG. 8. A variety of seals 138 may be deployed around the second portion 134 to form a secure seal with the corresponding housing 136. FIG. 8 illustrates one complete embodiment of the cable head system 32 which incorporates the various protective features described above. Cablehead system 32 is designed to enable the reliable, long-term communication of signals, e.g. electrical signals, with respect to the component 22 in a harsh, subsea environment. Because of the various insulation features located throughout cablehead system 32, substantial electrical power may be delivered through the connection.

Subsea well system 20 may be constructed in a variety of configurations for use with many types of well systems. The subsea component 22 may be used in various subsea installations, piping systems, service tools, valves, and other equipment employed in subsea well related operations. Furthermore, the cablehead system 32 may utilize individual features or combinations of the protective features to maintain a functional electrical connection for the desired life of the operation. Various materials also may be selected to improve the performance of the protective features. For example, various seals, e.g. seals 72, may be formed from a PEEK™ based material or other thermoplastic material able to provide temperature insulation in high-temperature environments. However, the specific seals, seal materials, grounding member, isolation sleeve, gel, and other protective components can be interchanged, redundant, or adjusted to accommodate a specific subsea application.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A cablehead system, comprising:
   a back cable clamp housing having an interior to receive an armored cable;
   a front cable clamp housing to which the back cable clamp housing is rotatably mounted; and
   a gel cavity housing connected between the first cable clamp housing and a bulkhead assembly, the gel cavity housing containing a dielectric gel to protect electrical conductor connections.

2. The cablehead system as recited in claim 1, further comprising a retention member positioned within the back cable clamp housing, wherein an armor layer of the armored cable is folded back over the retention member and held between the retention member and the back cable clamp housing.

3. The cablehead system as recited in claim 1, further comprising a plurality of wedge members positioned within the back cable clamp housing, wherein a plurality of armor layers of the armored cable is folded back over the plurality of wedge members and held between the plurality of wedge members and the back cable clamp housing.

4. The cablehead system as recited in claim 1, wherein the rotation of the back cable clamp housing with respect to the front cable clamp housing is limited to a desired included angle.

5. The cablehead system as recited in claim 1, further comprising a conductor sleeve positioned in the front cable clamp housing to segregate communication lines of the armored cable.

6. The cablehead system as recited in claim 1, further comprising a grounding arm secured to the front cable clamp housing and extending into the gel cavity housing.

7. The cablehead system as recited in claim 6, wherein a conductor wire and an armor wire extend from the armored cable and are placed into contact with the grounding arm.

8. The cablehead system as recited in claim 1, further comprising a pressure compensating bladder deployed in the gel cavity housing.

9. The cablehead system as recited in claim 1, wherein the front cable clamp housing comprises a gel inlet port through which gel is injected into the interior of the gel cavity housing; and a gel bleed off port.

10. A cablehead system, comprising:
a cable clamp housing which may be coupled to a bulkhead assembly by a cavity housing; and;
an armor clamping system by which an armored cable is secured to the cable clamp housing, the armor clamping system comprising a retention member formed as a ring within the cable clamp housing, wherein an armor layer of the armored cable is folded back over a leading edge of the retention member such that the armor layer extends through an interior of the retention member while an end flap of the armor layer is captured between the retention member and the cable clamp housing.

11. The cablehead system as recited in claim 10, wherein the armor clamping system further comprises an additional retention member, the additional retention member being used in cooperation with the retention member to secure a plurality of armor layers of the armored cable.

12. The cablehead system as recited in claim 10, wherein the cable clamp housing comprises a back cable clamp housing and a front cable clamp housing which are rotatably connected.

13. The cablehead system as recited in claim 10, wherein the cavity housing is a gel cavity housing containing a pressure equalizing bladder filled with a dialectic gel.

14. The cablehead system as recited in claim 10, further comprising a grounding member secured to the cable clamp housing and extending into the cavity housing.

15. The cablehead system as recited in claim 10, further comprising an elastomeric seal member positioned in the cable clamp housing between the armor clamping system and the bulkhead assembly.

16. A cablehead system, comprising:
a cable clamp housing which may be coupled to a bulkhead assembly by a cavity housing, the cable clamp housing having any interior to receive an armored cable; and
a grounding member conductively attached to the cable clamp housing and extending into the cavity housing, the grounding member being coupled with an armor wire and a conductor wire from the armored cable.

17. The cablehead system as recited in claim 16, wherein the armor wire and the conductor wire are routed through passages of a conductor sleeve positioned in the cable clamp housing to segregate communication lines of the armored cable.

18. The cablehead system as recited in claim 16, further comprising a dielectric gel disposed in the cable clamp housing.

19. The cablehead system as recited in claim 16, wherein the cable clamp housing comprises a back cable clamp housing and a front cable clamp housing which are rotatably connected.

20. A method, comprising:
forming a cablehead system with a cable clamp housing coupled to a gel cavity housing;
connecting an armored cable to the cable clamp housing by clamping an armor layer of the armored cable within the cable clamp housing;
filling the gel cavity housing with a dialectic gel injected through a port in the cablehead system; and
connecting the gel cavity housing to a bulkhead assembly at a subsea location.

21. The method as recited in claim 20, further comprising routing conductors of the armored cable through the cable clamp housing to contacts extending from the bulkhead assembly.

22. The method as recited in claim 20, further comprising grounding the armored cable with a grounding arm extending from the cable clamp housing to the gel cavity housing.

23. The method as recited in claim 20, further comprising pressure balancing an interior of the cablehead system with a bladder containing the dielectric gel in the gel cavity housing.

24. The cablehead system as recited in claim 13, wherein the gel is a 2-part solidifying compound.

25. The method as recited in claim 20, wherein the gel is a 2-part solidifying compound.

* * * * *